(12) United States Patent
Smith et al.

(10) Patent No.: US 8,764,113 B2
(45) Date of Patent: Jul. 1, 2014

(54) MODULAR SEAT APPARATUS

(75) Inventors: Paul Michael Smith, Davison, MI (US); Bradley Michael Glance, Dexter, MI (US); Thomas Grzybowski, Fraser, MI (US); Frank Glenn Walega, Greensboro, NC (US)

(73) Assignee: TK Holdings Inc., Auburn Hills, MI (US)

( * ) Notice: Subject to any disclaimer, the term of this patent is extended or adjusted under 35 U.S.C. 154(b) by 40 days.

(21) Appl. No.: 13/552,256

(22) Filed: Jul. 18, 2012

(65) Prior Publication Data
US 2013/0020847 A1    Jan. 24, 2013

Related U.S. Application Data

(60) Provisional application No. 61/509,508, filed on Jul. 19, 2011.

(51) Int. Cl.
*A47C 7/02* (2006.01)
*A47C 7/18* (2006.01)

(52) U.S. Cl.
USPC ............ 297/440.15; 297/440.16; 297/440.22; 297/218.1; 297/218.3

(58) Field of Classification Search
USPC ................. 297/440.15, 440.16, 218.1, 218.2, 297/218.3, 218.4, 218.5, 440.22
See application file for complete search history.

(56) References Cited

U.S. PATENT DOCUMENTS

| | | | |
|---|---|---|---|
| 3,330,600 A | 7/1967 | Robertson | |
| 3,669,496 A | 6/1972 | Chisholm | |
| 3,885,766 A * | 5/1975 | Resch et al. | 248/188.1 |
| 4,036,527 A | 7/1977 | Faul | |
| 4,059,306 A * | 11/1977 | Harder, Jr. | 297/218.3 X |
| 4,065,181 A | 12/1977 | Gunlock et al. | |
| 4,065,182 A | 12/1977 | Braniff et al. | |
| 4,079,994 A * | 3/1978 | Kehl | 297/440.22 |
| 4,280,269 A * | 7/1981 | Marini | 297/440.15 X |
| 5,468,045 A | 11/1995 | Weber | |
| 5,609,395 A * | 3/1997 | Burch | 297/452.55 |
| 5,655,816 A * | 8/1997 | Magnuson et al. | 297/440.22 X |
| 5,746,476 A | 5/1998 | Novak et al. | |
| 5,839,787 A * | 11/1998 | Magnuson et al. | 297/440.22 X |
| 5,924,771 A * | 7/1999 | Marchesi et al. | 297/440.15 X |
| 6,039,399 A | 3/2000 | Whalen et al. | |
| 6,116,696 A | 9/2000 | Widman et al. | |
| 6,123,388 A | 9/2000 | Vits et al. | |
| 6,312,056 B1 | 11/2001 | Murphy et al. | |
| 6,412,863 B1 | 7/2002 | Merrick et al. | |
| 6,415,494 B1 * | 7/2002 | Burch | 29/401.1 |
| 6,485,098 B1 | 11/2002 | Vits et al. | |
| 6,508,515 B2 | 1/2003 | Vits et al. | |
| 6,666,512 B1 | 12/2003 | Timon | |

(Continued)

*Primary Examiner* — Rodney B White
(74) *Attorney, Agent, or Firm* — Foley & Lardner LLP

(57) ABSTRACT

A modular seat assembly including a seat bottom, a seat back, and a fastener. The seat bottom having a frame and a cushion, the frame including a first member having a channel with an open end. The seat back having a back frame, a back cushion, a second member, and a first restraint system. The second member is configured to be removably coupled to the first member by the fastener with the channel of the first member receiving the second member through the open end. The seat assembly is configured such that the second member may be decoupled from the first member to decouple the first seat back from the seat assembly and replace the first seat back with a second seat back.

17 Claims, 7 Drawing Sheets

(56) References Cited

U.S. PATENT DOCUMENTS

| | | |
|---|---|---|
| 6,666,520 B2 | 12/2003 | Murphy et al. |
| 6,676,219 B1 | 1/2004 | Brewer |
| 6,752,465 B2 * | 6/2004 | Igarashi ............... 297/440.15 X |
| 6,772,764 B2 | 8/2004 | Chapman |
| 6,796,613 B2 | 9/2004 | Klink et al. |
| 6,886,889 B2 | 5/2005 | Vits et al. |
| 6,916,057 B2 | 7/2005 | Teich |
| 6,991,285 B1 * | 1/2006 | Hemenway .......... 297/440.16 X |
| 6,994,399 B2 | 2/2006 | Van-Thournout et al. |
| 7,029,067 B2 | 4/2006 | Vits et al. |
| 7,040,696 B2 | 5/2006 | Vits et al. |
| 7,055,901 B2 | 6/2006 | Graham et al. |
| 7,063,389 B2 | 6/2006 | Kennedy, Sr. |
| 7,063,390 B2 | 6/2006 | Suzuki et al. |
| 7,159,469 B2 | 1/2007 | Claude et al. |
| 7,303,235 B1 | 12/2007 | Fongers |
| 7,399,036 B2 * | 7/2008 | Kowal et al. ............. 297/440.16 |
| 7,500,722 B2 * | 3/2009 | Morris ......................... 297/483 |
| 7,673,939 B2 * | 3/2010 | Taguchi et al. ............ 297/218.1 |
| 7,857,383 B2 * | 12/2010 | Nguyen et al. ............ 297/218.1 |
| 7,938,485 B1 * | 5/2011 | Perciballi et al. .... 297/440.15 X |
| 8,061,780 B2 * | 11/2011 | Tsuji et al. ............. 297/218.1 X |
| 8,123,293 B2 * | 2/2012 | Marriott et al. .......... 297/216.13 |
| 8,191,966 B1 * | 6/2012 | Longenette ............ 297/218.1 X |
| 2002/0030391 A1 | 3/2002 | Merrick et al. |
| 2002/0063466 A1 | 5/2002 | Vits et al. |
| 2002/0079734 A1 | 6/2002 | Murphy et al. |
| 2003/0025380 A1 | 2/2003 | Vits et al. |
| 2004/0245813 A1 | 12/2004 | Steffens, Jr. |
| 2005/0110316 A1 | 5/2005 | Perrotti |
| 2005/0110328 A1 | 5/2005 | Kennedy, Sr. |
| 2005/0146186 A1 | 7/2005 | Kinnou et al. |
| 2005/0189800 A1 | 9/2005 | Nelson et al. |
| 2005/0189801 A1 | 9/2005 | Mattes et al. |
| 2005/0200172 A1 | 9/2005 | Graham et al. |
| 2005/0206205 A1 | 9/2005 | Nelson et al. |
| 2005/0269846 A1 | 12/2005 | Vits et al. |
| 2005/0269861 A1 | 12/2005 | Vits et al. |
| 2005/0275211 A1 | 12/2005 | Kennedy, Sr. |
| 2006/0255633 A1 | 11/2006 | Nelson et al. |
| 2007/0188005 A1 | 8/2007 | Crue |
| 2007/0216148 A1 | 9/2007 | Rosso |
| 2007/0262630 A1 | 11/2007 | Sawada et al. |
| 2007/0296252 A1 | 12/2007 | Mattes et al. |
| 2008/0001388 A1 | 1/2008 | Messner et al. |
| 2008/0030911 A1 | 2/2008 | Takikawa et al. |
| 2008/0174158 A1 * | 7/2008 | Ghisoni et al. ............. 297/218.3 |
| 2008/0191540 A1 | 8/2008 | Morris |
| 2008/0203790 A1 * | 8/2008 | Olarte ........................ 297/218.1 |
| 2008/0203793 A1 | 8/2008 | Boyle et al. |
| 2008/0231092 A1 | 9/2008 | Silva |
| 2008/0309111 A1 | 12/2008 | Marriott et al. |
| 2008/0315655 A1 | 12/2008 | Bokelmann et al. |
| 2009/0184561 A1 | 7/2009 | Wilson |
| 2009/0184562 A1 | 7/2009 | Wilson et al. |
| 2009/0189433 A1 | 7/2009 | Wilson et al. |
| 2010/0320826 A1 | 12/2010 | Wilson et al. |

* cited by examiner

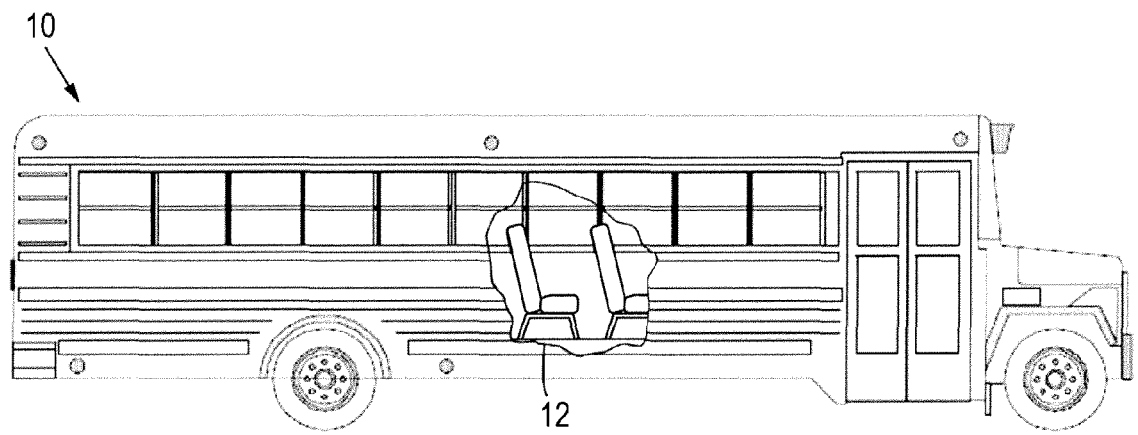
FIG. 1
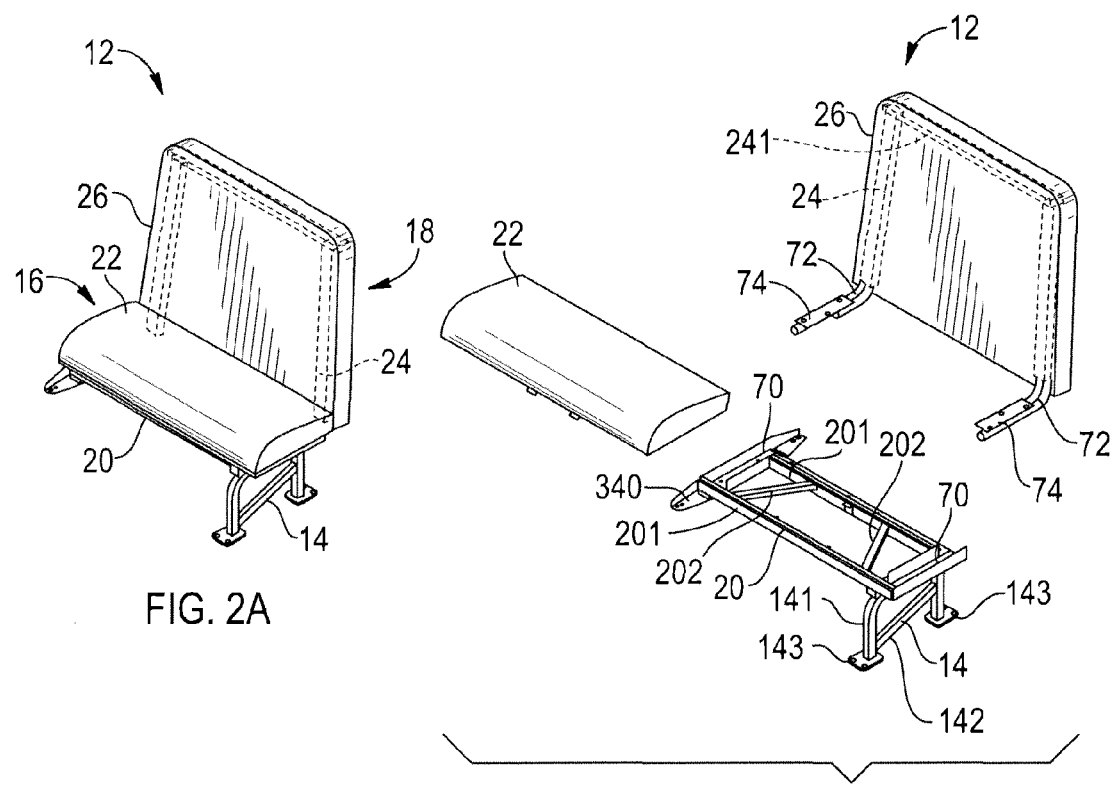
FIG. 2A
FIG. 2B

MODULAR SEAT APPARATUS

CROSS-REFERENCE TO RELATED PATENT APPLICATIONS

This application claims the benefit of and priority to U.S. Provisional Patent Application No. 61/509,508, filed on Jul. 19, 2011. U.S. Provisional Patent Application No. 61/509,508 is incorporated by reference herein in its entirety.

BACKGROUND

The present application relates generally to the field of vehicle seats. More specifically, the present application relates to a modular seat for mass transit vehicles, such as buses.

SUMMARY

One embodiment relates to a modular seat assembly including a seat bottom, a seat back, and a fastener. The seat bottom having a frame and a cushion, the frame including a first member having a channel with an open end. The seat back having a back frame, a back cushion, a second member, and a first restraint system. The second member is configured to be removably coupled to the first member by the fastener with the channel of the first member receiving the second member through the open end. The seat assembly is configured such that the second member may be decoupled from the first member to decouple the first seat back from the seat assembly and replace the first seat back with a second seat back.

Another embodiment relates to a method for replacing a first seat back assembly with a second seat back assembly for a vehicle seat assembly. The method includes removing fasteners coupling a first member to a second member, the second member also being coupled to a seat back frame, the first member also being coupled to a seat bottom frame; decoupling the second member from the first member; decoupling the second member from the seat back frame; coupling the second member to a second seat back frame; and coupling the second member to the first member by the fasteners. The seat back frame is configured having a first restraint system and the second seat back frame is configured having a second restraint system that is different than the first restraint system.

Yet another embodiment relates to a modular seat assembly for a vehicle. The modular seat assembly includes a pedestal having a first member; a seat bottom pivotally coupled to the pedestal and having a frame and a cushion, the bottom being configured to pivot between a seated position and an upright position; a seat back having a back frame, a back cushion, and a restraint system, the back frame having a second member; and a fastener. The seat assembly is configured such that the second member may be decoupled from the first member to decouple the first seat back from the seat assembly and replace the first seat back with a second seat back.

BRIEF DESCRIPTION OF THE DRAWINGS

FIG. 1 is a schematic side view of a vehicle including a modular seat, according to an exemplary embodiment.

FIG. 2A is an isometric view of a modular seat in a base configuration, according to an exemplary embodiment.

FIG. 2B is an exploded view of a modular seat in a base configuration, according to an exemplary embodiment.

DETAILED DESCRIPTION

Figure 3:
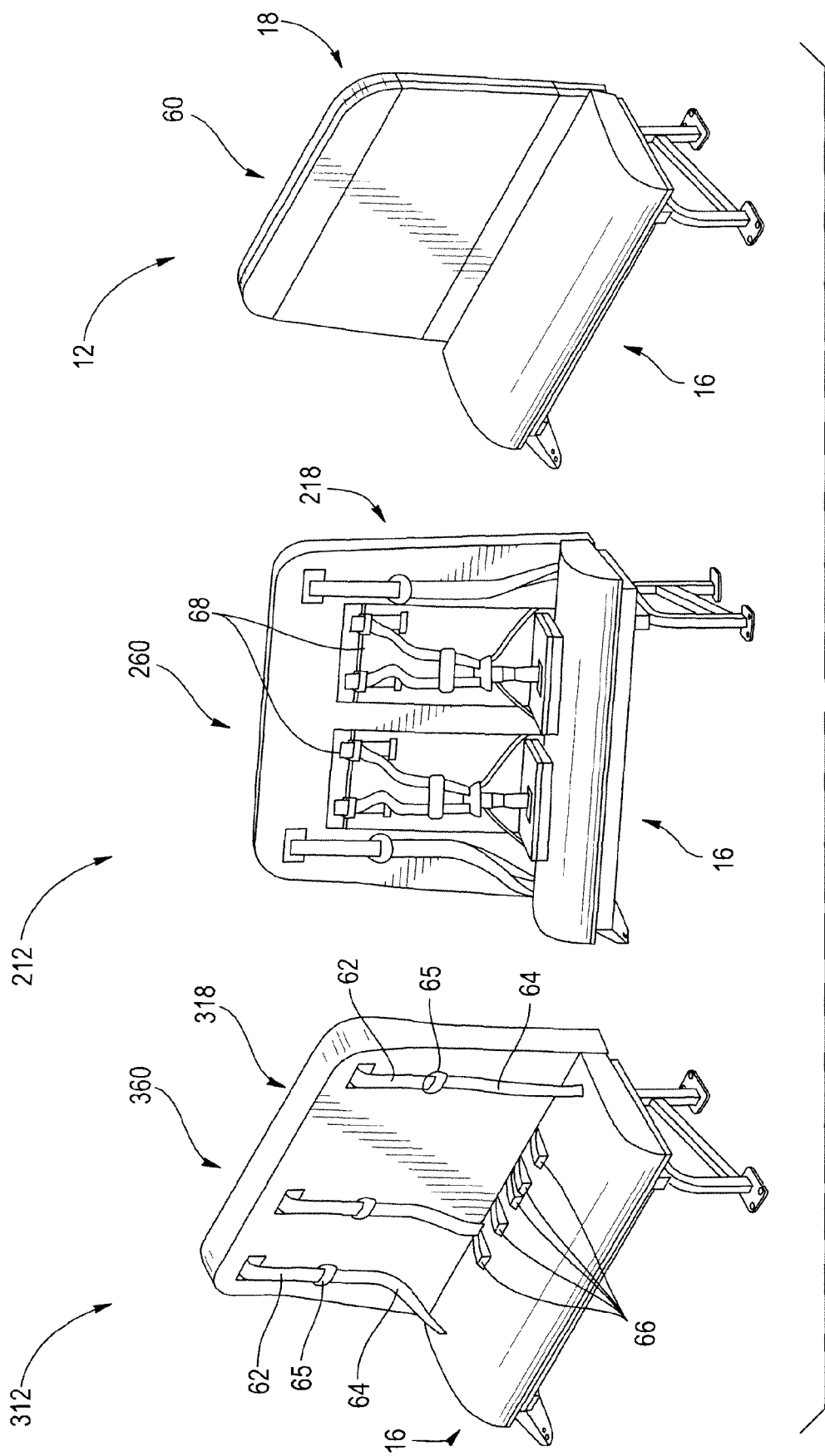
FIG. 3 illustrates isometric views of a modular seat in several configurations, according to an exemplary embodiment.

With general reference to the Figures, disclosed herein are modular seat systems having removable seat backs to allow replacement of the assembled seat back with another seat back having a different configuration. For example, the replacement seat back may be configured to provide different functionality, such as by having a restraint system with an arrangement that is different than the restraint system of the original seat back. Also, for example, the replacement seat back may be configured to provide different styling, such as by having a lower or thinner profile seat back relative to the original seat back. The seat systems are configured to allow the replacement of the seat back through a quick and relatively easy process by utilizing common connections between the various seat backs. The modular seat systems may advantageously allow an end user to purchase a vehicle including seat systems with seat back(s) having a first configuration, then modify the seat systems to include seat back(s) having a second configuration. This modularity allows the end user to tailor the vehicles, such as, for example, based on changes in requirements (e.g., changes in customer requirements, changes in vehicle safety standards, etc.) or other factors, such as cost and mass.

FIG. 1 illustrates a bus 10 equipped with a multitude of bench-type seats 12. However, it is noted that the modular seats disclosed herein may be configured for use in any vehicle, such as any mass transit vehicle configured to carry multiple passengers or occupants. Some mass transit vehicles, such as school buses, include compartmentalization or closely-spaced and well-padded seats with energy-absorbing seatbacks. While compartmentalization provides protection for the passengers of the bus in a frontal impact or a rear impact, it is further desirable to provide occupant restraint devices, such as seat belts, for added protection of the passengers.

Seat assemblies for mass transit vehicles, such as school bus seats, and those particularly with integrated three point restraints, are primarily designed as stand-alone seats, which can be very costly to produce. Many designs include completely integrated seat frames (consisting of mounting pedestals, lower seat bottom frame, and upper seat back frame) with added strength and complexity to support restraint systems such as lap and/or shoulder belts. Base seats are often built with the same frame design as a completely integrated seat frame, including the added strength and complexity, but do not include the lap and/or shoulder belts. The restraint system may then be added later by the bus owner or garage. There are several disadvantages to such a system. The full cost of added frame strength is incurred in initial cost of seat without seat belts. Seats with lap and/or shoulder belts usually require different foam and upholstery, requiring the cushions to be changed with the later addition of seat belts. Proper installation of lap and/or shoulder belts requires technical training and skills. The addition of three-point seat belt systems can increase the size of the seat and, therefore, decrease the number of total seats that can be placed in the bus.

Due to growing demand for three-point seatbelt systems on new school buses, many OEM producers of school buses have modified the designs of their bus bodies and floor structures of base level buses to withstand increased loads (e.g., forces) induced by loading of the lap and/or shoulder belts by the restrained occupant. This reduces the cost differential between school buses with no seat belts and school buses with lap and/or shoulder belts.

It would be advantageous to provide an improved vehicle seat that can easily be upgradeable from a base configuration to include a restraint system, such as a lap belt, a three-point seat belt, a child restraint system, or another suitable restraint system.

FIGS. 2A and 2B illustrate an exemplary embodiment of a seat 12 for use in a vehicle, such as the bus 10. The seat 12 may have any suitable shape and size, and may be configured to provide seating to one or more than one occupant (not shown) of the vehicle (e.g., the bus 10). For example, the seat 12 may be configured as a bench seat capable of providing seating to three occupants (not shown). According to an exemplary embodiment, the seat 12 includes a pedestal 14, a seat bottom 16 supported by the pedestal 14, and a seat back 18 supported by the seat bottom 16 and/or the pedestal 14. The seat 12 may include two (or more) pedestals 14, such as, configured at opposing ends or sides of the seat 12.

The mounting pedestal 14 (e.g., legs, supports, etc.) is configured to support the seat 12 in the vehicle (e.g., the bus 10), and may include one or more than one supports or members. As shown in FIGS. 2A and 2B, the pedestal 14 includes a first support 141 having an inverted U-shape and a second cross support 142 that extends between legs of the first support 141. The supports (e.g., first support 141, second support 142) may have any suitable configuration (e.g., shape, size, etc.). For example, the supports may have a circular or rectangular cross-section. The pedestal 14 is configured to mount to the vehicle. For example, the pedestal 14 may include a mount 143 (e.g., a foot) that is configured to be coupled to a structural member of the bus 10, such as, a floor or a side wall of the bus 10, using any suitable method (e.g., fasteners, welding, etc.). As shown in FIGS. 2A and 2B, each end of the U-shaped first support 141 includes a mount 143 disposed thereon to couple to the floor of the vehicle. Each mount 143 may be configured as a flange that extends outwardly from the support 141 to increase the size of the contact area between the pedestal 14 and the vehicle, or each mount 143 may have any suitable configuration. Also shown in FIGS. 2A and 2B, the pedestal 340 may be an L-shaped bracket configured to be coupled to the side wall of the bus 10 and configured to support the seat 12 from the opposite side of the pedestal 14. It should be noted that for the seat having more than pedestal, the pedestals may be similarly or differently configured, such as depending on the arrangement of the vehicle. Each pedestal 14, 340 may include a feature (e.g., attachment bracket) to support the seat bottom 16 and/or the seat back 18.

The seat bottom 16 may, for example, have a generally horizontal configuration to provide comfortable seating to the one or more than one occupant. The seat bottom 16 includes a rigid bottom frame 20 and a resilient bottom pad or cushion 22 provided above the bottom frame 20. The bottom frame 20 may have any suitable configuration, and may, for example, be configured as a tubular frame having one or more than one supports or members, or as a paneled frame. As shown in FIGS. 2A and 2B, the bottom frame 20 includes two spaced apart lateral supports 201 and two spaced apart cross supports 202 interconnected with the lateral supports 201. The supports 201, 202 may form a generally rectangular structure of the bottom frame 20 to support the generally rectangular bottom cushion 22. The bottom cushion 22 may include a foam pad or other cushioning member covered by a trim panel or cover. The seat bottom may include more than one seat frame and more than one seat cushion. For example, the seat bottom 16 may include a bottom frame 20 and a bottom cushion 22 for each seating position provided by the seat 12. It is noted that the bottom frame 20 and bottom cushion 22 may have any suitable configuration (e.g., shape, size, etc.), and the embodiments disclosed herein are not limiting.

The seat back 18 may, for example, have a generally vertically configuration to provide back support to the one or more than one seated occupant, or may be configured at any angle relative to vertical to provide comfortable seating support to the occupant. The seat back 18 may include a back cushion 26 supported by a rigid back frame 24. The back frame 24 may have any suitable configuration, and may, for example, be configured as a tubular frame having one or more than one supports or members, or as a paneled frame. As shown in FIGS. 2A and 2B, the back frame 24 includes an inverted U-shaped support 241, which may be a tube, that extends around the periphery of the seat back 18. The back frame 24 may also include a panel (not shown) interconnected with the support 241 to provide structure to support the back cushion 26, such as, in the open space located between the legs of the U-shaped support 241. The back cushion 26 may include a foam pad or other cushioning member covered by a trim or cover. According to an exemplary embodiment, the back cushion 26 may have a cover that is closed with a recloseable (i.e., reversible) fastener, such as, for example a zipper. It should be noted that the back frame 24 and back cushion 26 may have any suitable configuration (e.g., shape, size, etc.), and the embodiments disclosed herein are not limiting.

The seat back 18 is configured to be selectively or removably coupled to the seat bottom 16 and/or the pedestal(s) 14 to provide a modular seat system. In other words, the seat back 18 is configured to be detachably coupled to the seat 12 in order to allow for the seat back 18 to be removed and replaced with a second seat back having a differently arranged restraint system or configured to provide the modularity.

As shown in FIG. 2B, the seat back 18 is configured to be removably coupled to the seat bottom 16 by coupling the back frame 24 to the bottom frame 20 at a connection. According to the embodiment having the back cushion 26 (and/or bottom cushion 22) with a cover utilizing the zipper, the zipper may be moved to an open position to provide access to the connection coupling the back frame 24 and the bottom frame 20. According to an exemplary embodiment, the bottom cushion 22 may be removable to provide access to the connection. Thus, the seat back 18 may be decoupled from the seat bottom 16 and a different seat back (e.g., the second seat back) may be coupled to the seat bottom 16. The zipper may then be moved to a closed position to conceal the connection.

According to an exemplary embodiment, the connection includes a first member 70 coupled to the seat bottom 16, such as the bottom frame 20, and a second member 72 coupled to the seat back 18, such as the back frame 24. The second member 72 is configured to couple to (and decouple from) the first member 70 to couple (decouple) the seat back 18 to (from) the seat bottom 16 to provide the modular seat 12. The second member 72 may be coupled to the first member 70 using one or more than one fastener 76 (e.g., bolt, screw, etc.), or any other suitable device that provides a removable connection. For example, the first member 70 may be detachably coupled to the bottom frame 20, and the second member 72 may be detachably coupled to the back frame 24. According to other embodiments, the first member 70 may be integrally formed with the seat bottom 16, such as with a support of the bottom frame 20, and/or the second member 72 may be integrally formed with the seat back 18, such as with a support of the back frame 24.

As shown in FIGS. 2A and 2B, the seat bottom 16 includes two first members 70 disposed on opposing sides of the bottom frame 20, where each first member 70 is configured as a channel having two spaced apart legs that extend away from a base to form a generally U-shaped cross-section that is open at the top. Also shown, the seat back 18 includes two second members 72 disposed on opposing sides of the back frame 24, where each second member 72 is configured as an arm. Each second member 72 is configured to engage one first member 70 for coupling the back frame 24 to the bottom frame 20. Thus, the pair of arms forming the second members 72 of the back frame 24 are received in the pair of channels forming the first members 70 of the bottom frame 20. Each second member 72 is secured in the first member 70 using, for example, one or more than one fastener 76. It is noted that the seat may be configured having only one connection or more than two connections, and the examples disclosed herein are not limiting.

Figure 8:
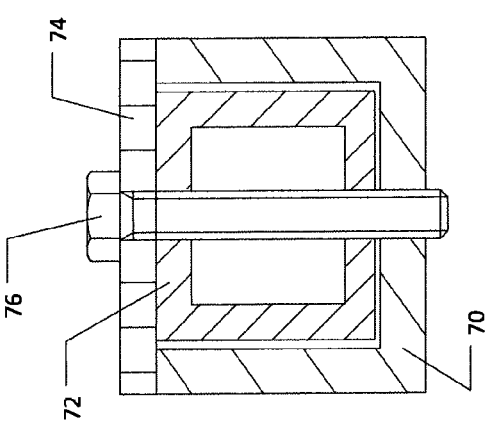

The connection may include additional members, such as, to help couple the first and second members together. For example, the connection of the seat 12 may include a third member 74 to secure the second member 72 to the first member 70. As shown in FIG. 2B, the third member 74 is configured as a plate that is provided above the open end of the first member 70 and above the second member 72 disposed in the channel of the first member 70. A fastener 76 may interconnect the first, second, and third members 70, 72, 74 together, such as, by having the head of the fastener 76 disposed above the third member 74 and the shank extending downwardly through the members as shown in FIG. 8. According to an exemplary embodiment, the first member 70 may have a threaded hole that threads with the fastener 76, and the second and third members 72, 74 have through holes (i.e., clearance holes, openings) for the fastener 76 to pass through. However, each member may be configured having a threaded hole, a clearance hole, or any combination thereof. For example, each member forming the connection may have one or more through holes, and the connection may also include a nut or any other suitable fastening device to secure the members in place with the fastener 76.

According to another exemplary embodiment, each fastener 76 extends upwardly through openings in the seat bottom frame 20, in a first member 70, and in a second member 72 to engage threads in the third member 74. For example, a base seat back (e.g., the seat back 18 having no restraints) may be attached to the seat frame (e.g., the bottom frame 20) with two bolts on either side of the frame, and the seat backs having restraints (e.g., lap belt, shoulder belt, integrated child restraint) may be attached with three bolts on either side of the frame.

Figure 12:
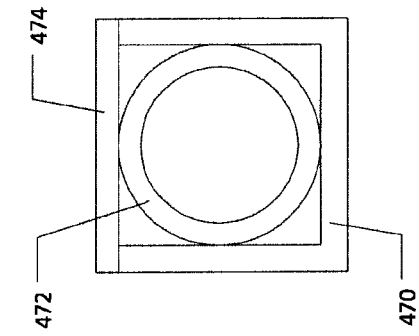
FIGS. 8-13 are cross-sectional views of various exemplary embodiments of the connections between the first and second members removably coupling the back frame to the seat.
Figure 10:
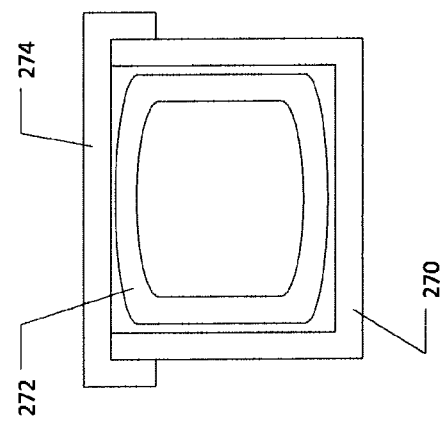
Figure 13:
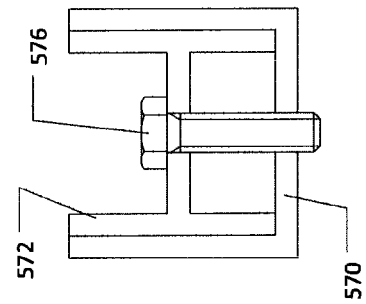
Figure 11:
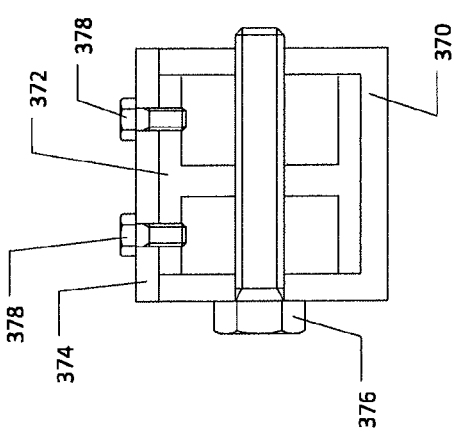
Figure 9:
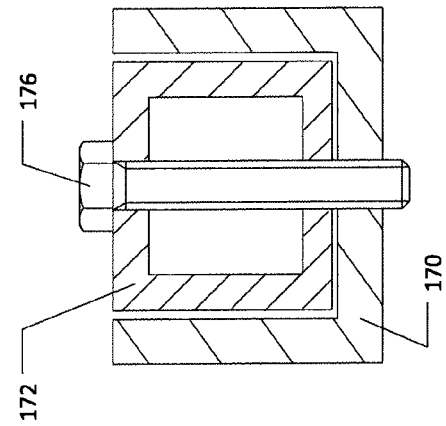

FIGS. 9-13 illustrate other various exemplary embodiments of connections between the first and second members of the seat to provide removability of the seat back from the seat bottom and/or the pedestal. It is noted that the various embodiments are not limiting, but are merely examples of connections. FIG. 9 illustrates a fastener 176 coupling a tubular (e.g., generally rectangular) second member 172 to a generally U-shaped first member 170. FIG. 10 illustrates a generally inverted U-shaped third member 274 disposed above a generally U-shaped first member 270 forming a cavity therebetween in which the tubular (e.g., oval) second member 272 is disposed. The opposing U-shapes of the first and third members 270, 274 may have a wrapping configuration as shown or may have any suitable configuration. The members 270, 272, 274 may be secured using one or more than fastener. FIG. 11 illustrates a generally U-shaped first member 370 forming a channel for receiving a generally I-shaped second member 372, where a generally flat third member 374 is provided above the first and second members 370, 372. The connection may include more than one fastener, such as, for example, having a first horizontal fastener 376 coupling the first member 370 to the second member 372 and having second fasteners 378 coupling the third member 374 to the second member 372. FIG. 12 illustrates a generally U-shaped first member 470 having a channel for receiving a tubular (e.g., generally round) second member 472, where a third member 474 is provided at the ends of the legs of the U-shaped first member 470. The members 470, 472, 474 may be secured using one or more than fastener. FIG. 13 illustrates a generally U-shaped first member 570 forming a channel for receiving a generally H-shaped second member 572. The first member 570 may be secured to the second member 572 using a fastener 576.

FIG. 3 illustrates an exemplary embodiment of the modular seat 12. The modular seat 12 can be reconfigured from having a base or first configuration of a restraint system (e.g., without any restraint system) to an upgraded or second configuration of a restraint system by replacing the seat back 18 with a second seat back 318 (or another seat back, such as a third seat back 218). The modular seat system includes common mounting pedestal(s) 14 and seat bottom frame(s) 20 with a detachable (e.g., bolt on or "convertible") seat back to allow the seat back to be replaced with a differently configured seat back. In other words, the modular seat system is adaptable or reconfigurable to allow attachment of a variety of seat backs configured having a variety of restraint systems and/or designs. For example, the various seat backs may be configured without restraints, having one or more seat belt assemblies, having one or more child restraint assemblies, or having any suitable configuration of restraints.

According to one exemplary embodiment, the modular seat 12 may be configured having the seat back 18 with a first configuration of a restraint system 60. The first configuration of restraint system 60 may be devoid of any restraints. In other words, the seat back 18 may be configured without any occupant restraints.

According to another exemplary embodiment, the modular seat 312 may be configured having the seat back 318 with a second configuration of a restraint system 360. The second configuration of the restraint system 360 may include multiple three-point seat belt assemblies, where each seat belt assembly includes a webbing divided into a shoulder belt 62 and a lap belt 64 by a tongue member 65 (e.g., latch plate) that is releasably fastened to a buckle mechanism 66. As shown in FIG. 3, the restraint system 360 may include multiple buckles 66 (e.g., more than one buckle 66 for each tongue member 65) to accommodate passengers of various sizes. For example, the restraint system 360 may include five buckles 66 having a spaced arrangement to accommodate either three child-sized passengers or two adult-sized passengers. The buckles 66 may also be "keyed" to limit the potential for improper usage.

According to yet another example, the modular seat 212 may be configured having the seat back 218 including one or more than one child restraint assembly 68. As shown in FIG. 3, the seat 212 includes two child restraint devices 68, where each child restraint 68 is configured as a five-point seat belt. It is noted that any suitable child restraint device may be utilized with the seat 212, such as a thin-profile seat back or integrated child seat (ICS).

The seats 12, 212, 312 may have seat backs configured with other types of restraint systems, and those disclosed herein are not limiting. For example, the seat back 18 of seat 12 may be replaced with a seat back having only one or more than lap belt (i.e., without shoulder belts) to provide the seat 12 with one or more two-point restraint system. Thus, the modular seats as disclosed herein may be reconfigured having any suitable arrangement.

The restraint system 60, 160, 260 of the seat back 18, 118, 218 may be accessed, such as, for example, for installation, maintenance, or service by opening and/or removing the cover of the seat back cushion. For example, the seat back 18, 118, 218 having the cover with the zipper may be configured to provide the access. The zipper may also provide for easy replacement of the cover to provide an additional level of modularity. Thus, the cover may be reused with other seat backs or a new cover can be used to replace the cover on an existing seat back.

Figure 4:
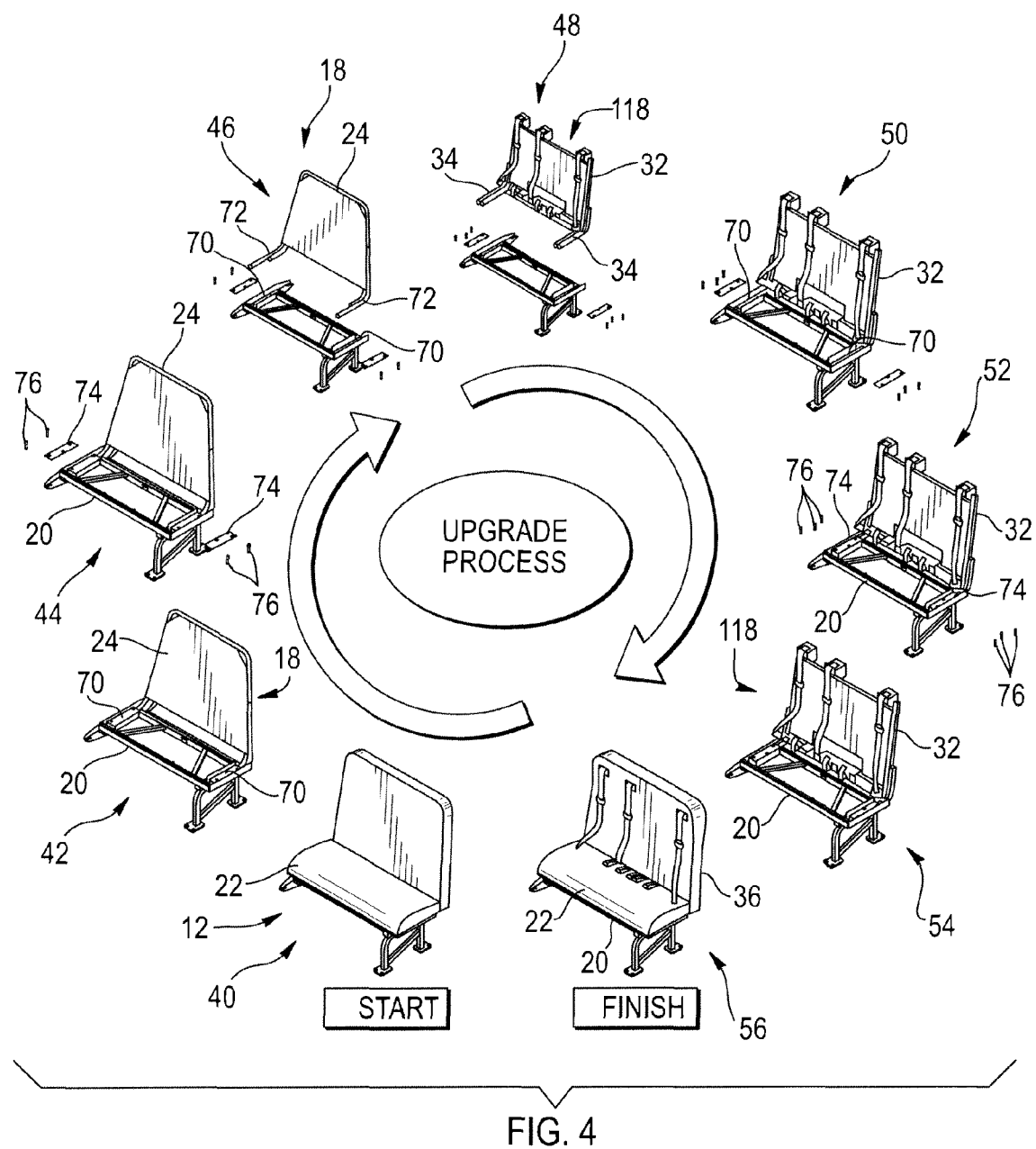
FIG. 4 illustrates a process for installing a seat back for a modular seat, according to an exemplary embodiment.
Figure 5:
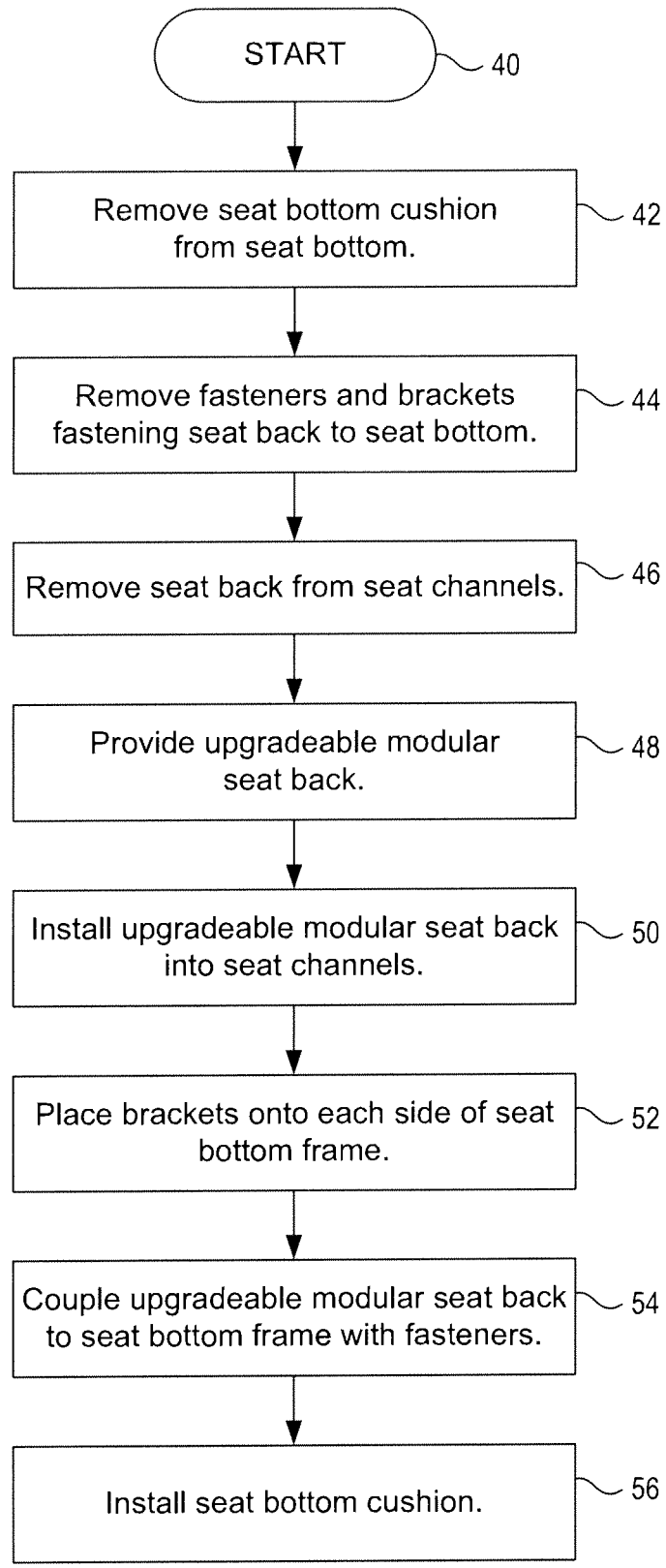
FIG. 5 is a flowchart of the process of FIG. 4, according to an exemplary embodiment.

FIGS. 4 and 5 illustrate an exemplary method or process for replacing the seat back 18 of the seat 12 with the second seat back 118. The seat back 118 may be configured similarly to, the same as, or differently than the seat back 318. As shown, the method involves nine steps or processes, but it is noted that other suitable methods may be used having a different number of steps. In a first step 40, the seat 12 as described above is provided. In a second step 42, the seat bottom cushion 22 is removed from the seat bottom 16 to expose the seat bottom frame 20. In a third step 44, the fasteners 76 coupling the seat back frame 24 to the seat bottom frame 20 are removed. Accordingly, for the examples having third member(s) (e.g., the third member 74), the third member(s) may be removed along with the fasteners. For example, a base seat may include the seat back frame 24 having two opposing second members 72 coupled to two opposing first members 70 of the seat bottom frame 20 at two connections, where each connection includes two fasteners 76 coupling the respective set of first and second members 70, 72 together. Also, for example, a seat having restraints (e.g., lap belt, shoulder belt, integrated child restraint) may be attached with three bolts on either side of the frame.

Once the third members 74 (e.g., brackets) and/or the fasteners 76 (e.g., bolts) are removed, in a fourth step 46, the second members 72 coupled to arms of the seat back 18 are removed from the respective channels of the first members 70 coupled to the seat bottom frame 20 of the seat bottom 16. For example, the seat back 18 may be pulled vertically away from the seat bottom 16, such that the arms of the second members 72 are pulled vertically from the channels of the first members 70. For the examples having the second members 72 detachably coupled to the arms of the seat back 18, the second members 72 may be decoupled from the seat back 18 (and be coupled to the arms of the replacement seat back). In a fifth step 48, a replacement modular seat back 118 is provided. As described above, the replacement seat back 118 may include a restraint system 60, such as where the base seat back 18 did not include restraints, or the replacement seat back 118 may include a different restraint system, such as where the base seat back 18 includes restraints. Additionally, the replacement seat back 118 may include a differently styled seat back (e.g., a thin-profile seat back). In a sixth step 50, the replacement seat back 118 is assembled or installed such that the arms 34 of the seat back frame 32 and/or the second members 72 are received in the channels of the first members 70. In a seventh step 52, the brackets (e.g., the third members 74) are placed over the arms 34 and/or the second members 72 in the open end of the channels of the first members 70. In an eighth step 54, the replacement seat back 118 is secured to the seat bottom frame 20 using the fasteners 76 (e.g., bolts). In a ninth step 56, the seat bottom cushion 22 is reassembled or reinstalled (for those embodiments configured as such).

Various seat backs 18, 118, 218, 318 having a range of configurations utilizing a common mounting system allows an end user to determine and rearrange the configuration of the seat 12, 212, 312 based on their unique needs and resources. Not all states require three-point restraint systems at this time, so an end user could purchase buses having seats with base configurations, then replace the seat backs of the seats with configurations having restraint systems when the requirements change. Fiscal constraints of a school budget may make it difficult to justify increased costs of stand-alone three-point restraint systems. For instance, a school district with a limited budget may initially assemble a fleet of busses with seats 12 arranged in a base configuration, (e.g., with no restraint systems). The modularity of the seat backs 18, 118, 218, 318 provides a future cost effective, quick, and easy way to retrofit a bus by later upgrading the bus to include seat backs 118, 218, 318 including various configurations of restraint systems 260, 360.

Because the replacement seat backs 118, 218, 318 are configured to couple to a common seat bottom(s) 16 and/or pedestal(s) 14, each seat back 118, 218, 318 may be replaced without effecting the major dimensions or footprint of the seat 12. The seat 12 may, therefore, be changed or upgraded without increasing seat spacing, reducing the seating capacity of the bus 10, or otherwise require reconfiguration of the bus. The seat 12 and, in particular, the pedestal may also be provided with a wide seat foot to reduce the potential for floor puckering or other deformation of the floor of the bus 10.

According to an exemplary embodiment, the seat backs 18, 118, 218, 318 are coupled to seat bottom 16 with standard fasteners 76, such as bolts. Thus, the process to replace the seat backs 18, 118, 218, 318 may be accomplished with common tools in a quick and efficient manner by the end user. In addition, the connection(s) that interconnect the seat bottom 16 and the seat backs 18, 118, 218, 318 utilize common tools and, thus, no special training is required by the person replacing the seat back to allow quick and easy "conversions" to be conducted.

The seat backs 118, 218, 318 as disclosed herein having restraint systems 260, 360 may advantageously self-contain the restraint system within the seat back. By having a self-contained restraint system 260, 360 within the seat back 218, 318 no modifications need to be made to the seat bottom to add seat restraint functionality to the seat. The installer is not required to swap trim, foam, or seatbelt components to complete the upgrade. Seat restraint installation may be accomplished by the end user instead of an intermediary such as a dealer, thereby reducing liability concerns.

Figure 6:
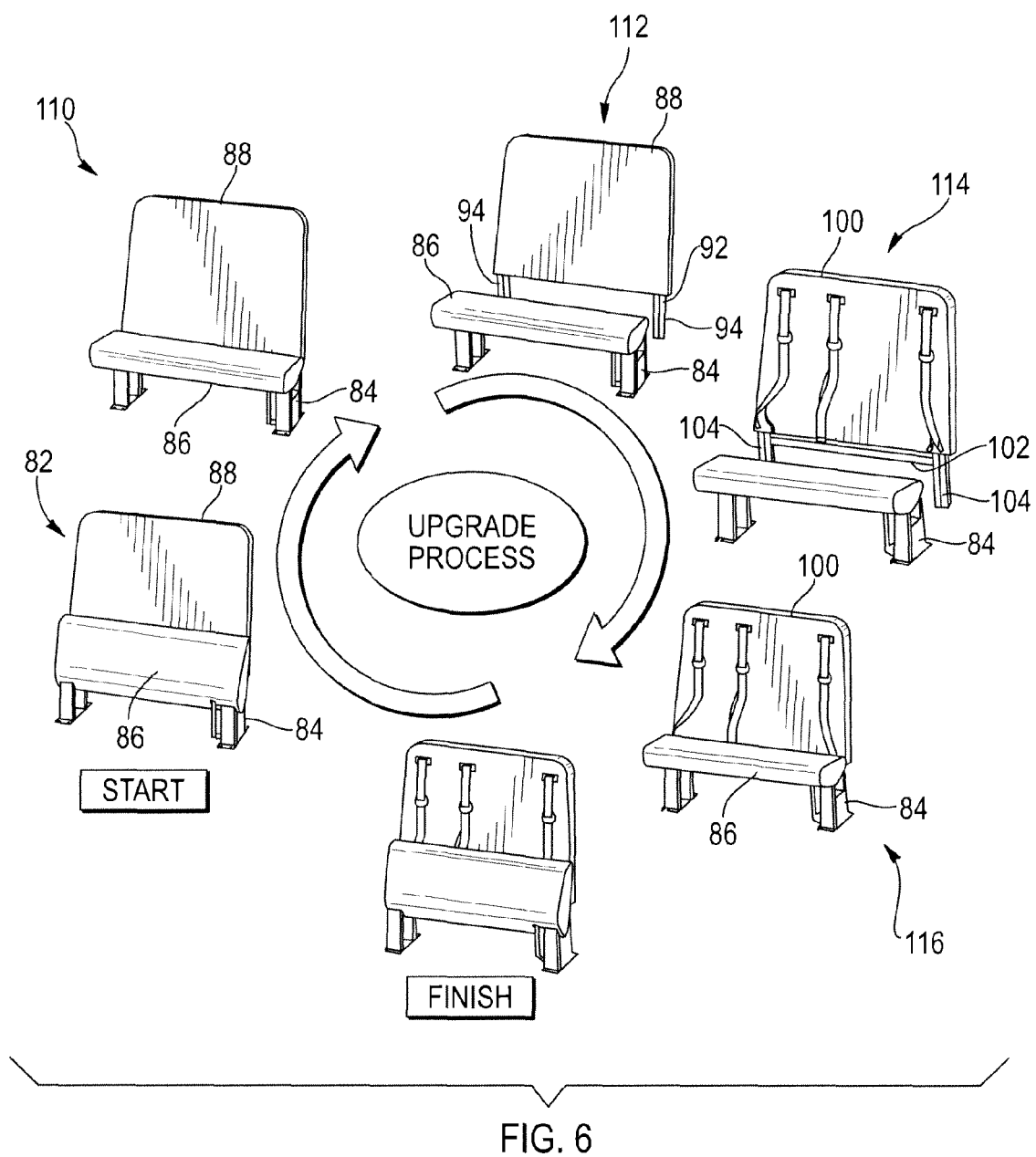
FIG. 6 illustrates a process for installing a seat back for a modular seat, according to another exemplary embodiment.
Figure 7:
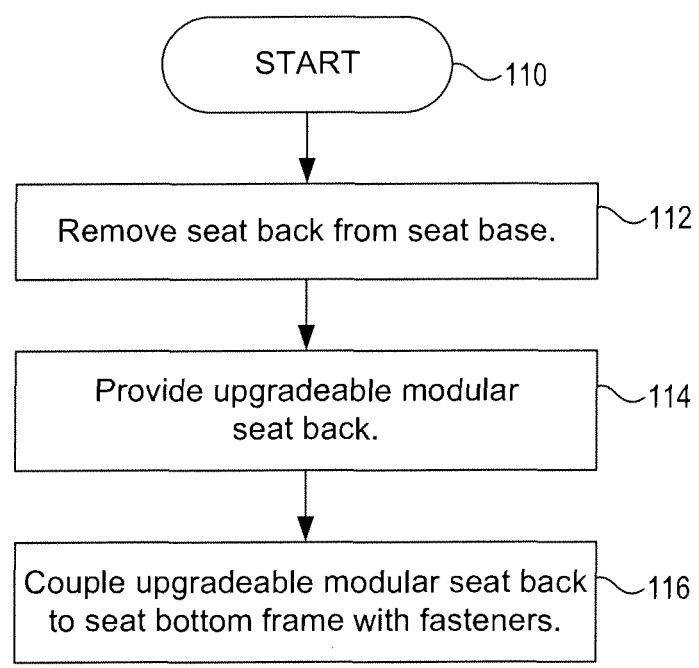
FIG. 7 is a flowchart of the process of FIG. 6, according to an exemplary embodiment.

FIGS. 6 and 7 illustrate a seat 82 according to another exemplary embodiment. School busses may contain other type of seats such as "flip" seats 82, such as where the seat bottom 86 is configured to rotate (e.g., flip) from a seating position to a stored position (e.g., generally vertical). As shown, the seat 82 includes pedestals 84 that are configured to mount to the vehicle and to support a seat bottom 86 and a seat back 88. For example, the seat bottom 86 may be pivotally coupled to the pedestals 84 and the seat back 88 may be fixedly coupled to the pedestals 84, such that the seat bottom 86 may rotate relative to both the pedestals 84 and the seat back 88. Thus, unlike the seat 12 described above, the seat bottom 86 of the "flip" seat 82 can be rotated from a seating position, such as having a generally horizontal orientation, upwardly to a non-seating or stored position, such as a generally vertical orientation that is adjacent to or abutting the seat back 88. The vertical orientation of the seat bottom 86 may be utilized, for example, to provide additional storage space between seats 82 or to accommodate passengers in a wheelchair.

Each pedestal 84 may include a first member that is configured to be coupled to a second member of the seat back 88. The first and second members may be configured similar to or different than the first and second members described above for seat 12. For example, the pedestal 84 may include a first member that is either integrally formed therewith or formed separately then coupled thereto. The first member of the pedestal 84 may have any suitable configuration, such as having a U-shape cross section that extends generally vertically with an open end facing a rearward direction relative to the seat. Thus, the first member of the pedestal 84 may form a vertically arranged channel in order to receive a vertically arranged second member. The second member of the seat back 88 may extend downwardly from the back frame, and may be either integrally formed therewith or formed separately then coupled thereto.

Also shown in FIGS. 6 and 7 is an exemplary four step method or process for replacing the seat back 88 of the seat 82 with a replacement seat back 100. In a first step 110, the seat 82 as described above is provided. In a second step 112, the one or more fasteners (e.g., bolts) coupling the seat back frame 92 to the pedestals 84 are removed. According to an exemplary embodiment, the seat back frame 92 includes a pair of arms 94 that are removably coupled to the pedestals 84. According to other exemplary embodiments, the back frame 92 includes a second member attached to each arm 94, where the second member is detachably coupled to the pedestal or a first member attached to the pedestal. Once the fasteners are removed, the seat back 88 is decoupled (or removed) from the pedestal(s) 84. In a third step 114, a modular replacement seat back 100 is provided. As described above, the replacement seat back 100 may include a restraint system (e.g., the restraint system 260, the restraint system 360, etc.) or may be a differently styled seat back (e.g., a thin-profile seat back). Similar to the seat back 88, the replacement seat back 100 includes a frame 102 with a pair of arms 104. In a fourth step 116, the replacement seat back 100 is assembled or installed to the seat 82 by coupling the arms 104 of the seat back 100 to the pedestals 84.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the seat as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosure herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. Other substitutions, modifications, changes and omissions may be made in the design, operating conditions and arrangement of the exemplary embodiments.

What is claimed is:

1. A modular seat assembly for a vehicle, comprising:
   a seat bottom having a frame and a cushion, the frame including a first member having a channel with an open end, wherein the channel includes an elongated base and two spaced apart side walls extending from the base to define the open end opposite the base;
   a seat back having a back frame, a back cushion, a second member, and a first restraint system, wherein the second member is an arm configured to engage the base of the channel;
   a fastener; and
   a third member configured to be coupled to the first member to secure the arm to the channel;
   wherein the second member is configured to be removably coupled to the first member by the fastener with the channel of the first member receiving the second member through the open end;
   wherein the seat assembly is configured such that the second member may be decoupled from the first member to decouple the first seat back from the seat assembly and replace the first seat back with a second seat back.

2. The modular seat assembly of claim 1, wherein the first restraint system is one of a five point seatbelt assembly, a four point seatbelt assembly, a three point seatbelt assembly, a two point seatbelt assembly, and an integrated child restraint.

3. The modular seat assembly of claim 2, wherein the second seat back includes a second restraint system that is one of a five point seatbelt assembly, a four point seatbelt assembly, a three point seatbelt assembly, a two point seatbelt assembly, and an integrated child restraint; and wherein the second configuration of the restraint system is different than the first restraint system.

4. The modular seat assembly of claim 1, wherein the channel extends in a generally horizontal direction such that the open end is above the base.

5. The modular seat assembly of claim 1, wherein the third member is a bracket that is disposed on the open end of the channel, and wherein the fastener couples the bracket to the channel through the arm to retain the arm in the channel.

6. The modular seat assembly of claim 1, wherein the arm is configured as a tube having an outer wall that is provided adjacent to the base and the side walls of the channel.

7. A modular seat assembly for a vehicle, comprising:
a seat bottom having a frame and a cushion, the frame including a first member having a channel with an open end, wherein the channel includes an elongated base and two spaced apart side walls extending from the base to define the open end opposite the base;
a seat back having a back frame, a back cushion, a second member, and a first restraint system; and
a fastener;
wherein the second member is configured to be removably coupled to the first member by the fastener with the channel of the first member receiving the second member through the open end;
wherein the seat assembly is configured such that the second member may be decoupled from the first member to decouple the first seat back from the seat assembly and replace the first seat back with a second seat back; and
wherein the arm is configured as an I-beam.

8. The modular seat assembly of claim 1, wherein the seat bottom cushion is removably coupled to the seat bottom frame, such that the seat bottom cushion can be removed to allow access to the first and second members to allow the first and second back frames to be selectively decoupled from the second member.

9. A method for replacing a first seat back assembly with a second seat back assembly for a vehicle seat assembly, comprising:
removing fasteners coupling a first member to a second member, the second member also being coupled to a seat back frame, the first member including a channel having an open end and also being coupled to a seat bottom frame, wherein second member is an arm configured to engage the channel through the open end;
removing a bracket that is disposed on the open end of the channel to retain the arm in the channel;
decoupling the second member from the first member;
decoupling the second member from the seat back frame;
coupling the second member to a second seat back frame; and
coupling the second member to the first member by the fasteners;
wherein the seat back frame is configured having a first restraint system and the second seat back frame is configured having a second restraint system that is different than the first restraint system.

10. The method of claim 9, further comprising removing a seat bottom cushion from the seat bottom frame to allow access to remove the fasteners coupling the first and second members.

11. The method of claim 9, wherein the first restraint system is one of a five point seatbelt assembly, a four point seatbelt assembly, a three point seatbelt assembly, a two point seatbelt assembly, and a child restraint; and wherein the second restraint system is one of a five point seatbelt assembly, a four point seatbelt assembly, a three point seatbelt assembly, a two point seatbelt assembly, and a child restraint, the second configuration of the restraint system being different than the first configuration of the restraint system.

12. A modular seat assembly for a vehicle, comprising:
a pedestal having a first member including a channel having an elongated base and two spaced apart side walls extending from the base to define an open end opposite the base;
a seat bottom pivotally coupled to the pedestal and having a frame and a cushion, the bottom being configured to pivot between a seated position and an upright position;
a seat back having a back frame, a back cushion, and a restraint system, the back frame having a second member in the form of an arm that is configured to engage the channel of the first member;
a third member provided over the open end and covering the arm; and
a fastener that detachably couples the third member to the first member to secure the arm in the channel;
wherein the seat assembly is configured such that the second member may be decoupled from the first member via the open end of the channel to decouple the first seat back from the seat assembly and replace the first seat back with a second seat back.

13. The modular seat assembly of claim 12, wherein the first member is configured as a channel including an elongated base and two spaced apart side walls extending from the base to define an open end opposite the base, and wherein the second member is configured as an arm that is configured to engage the base of the channel.

14. The modular seat assembly of claim 12, wherein the third member is a bracket that is disposed on the open end of the channel.

15. The modular seat assembly of claim 14, wherein the fastener couples the bracket to the channel through the arm.

16. The modular seat assembly of claim 14, further comprising a second fastener that detachably couples the channel to the arm.

17. The modular seat assembly of claim 1, further comprising a pedestal, wherein the seat bottom is configured to pivot between a seated position and an upright position relative to the pedestal.

* * * * *